United States Patent
Wenzel

(10) Patent No.: US 6,726,457 B2
(45) Date of Patent: Apr. 27, 2004

(54) COMPRESSOR WITH SUPERCHARGED INLET

(76) Inventor: Harald Wenzel, Hitzkirchener Strasse 2, D-63699 Kefenrod (DE)

( * ) Notice: Subject to any disclaimer, the term of this patent is extended or adjusted under 35 U.S.C. 154(b) by 0 days.

(21) Appl. No.: 09/890,930

(22) PCT Filed: Dec. 8, 2000

(86) PCT No.: PCT/DE00/04388
§ 371 (c)(1),
(2), (4) Date: Oct. 12, 2001

(87) PCT Pub. No.: WO01/44635
PCT Pub. Date: Jun. 21, 2001

(65) Prior Publication Data
US 2002/0127122 A1 Sep. 12, 2002

(30) Foreign Application Priority Data
Dec. 14, 1999 (DE) .......................... 199 60 152

(51) Int. Cl.$^7$ .......................... F04B 17/00; F04B 25/00; F04B 23/14
(52) U.S. Cl. .................. 417/364; 417/380; 417/244; 417/201
(58) Field of Search ................. 417/364, 380, 417/244, 201, 205, 406, 407; 60/612, 602

(56) References Cited

U.S. PATENT DOCUMENTS

| | | | |
|---|---|---|---|
| 3,141,604 A | * 7/1964 | Williams | 417/203 |
| 3,917,474 A | * 11/1975 | Heckenkamp et al. | 96/189 |
| 4,169,354 A | * 10/1979 | Woollenweber | 60/600 |
| 4,563,132 A | 1/1986 | Grimmer | 417/247 |
| 4,679,992 A | * 7/1987 | Watanabe et al. | 417/364 |
| 5,154,585 A | * 10/1992 | Spencer | 417/364 |
| 5,385,449 A | * 1/1995 | Wenzel | 417/243 |

FOREIGN PATENT DOCUMENTS

| | | |
|---|---|---|
| DE | 2154726 | 5/1973 |
| DE | 3932721 | 10/1990 |
| GB | 1441498 | 6/1976 |

* cited by examiner

Primary Examiner—Charles G. Freay
Assistant Examiner—Timothy P. Solak
(74) Attorney, Agent, or Firm—Sofer & Haroun, LLP

(57) ABSTRACT

The invention relates to a compressor system for production of compressed air, consisting of a compressor driven by an internal combustion engine, connected by piping to compressed air discharge points and supplied with precompressed air by an exhaust turbocharger on the drive side connected on the exhaust side of the internal combustion engine.

10 Claims, 1 Drawing Sheet

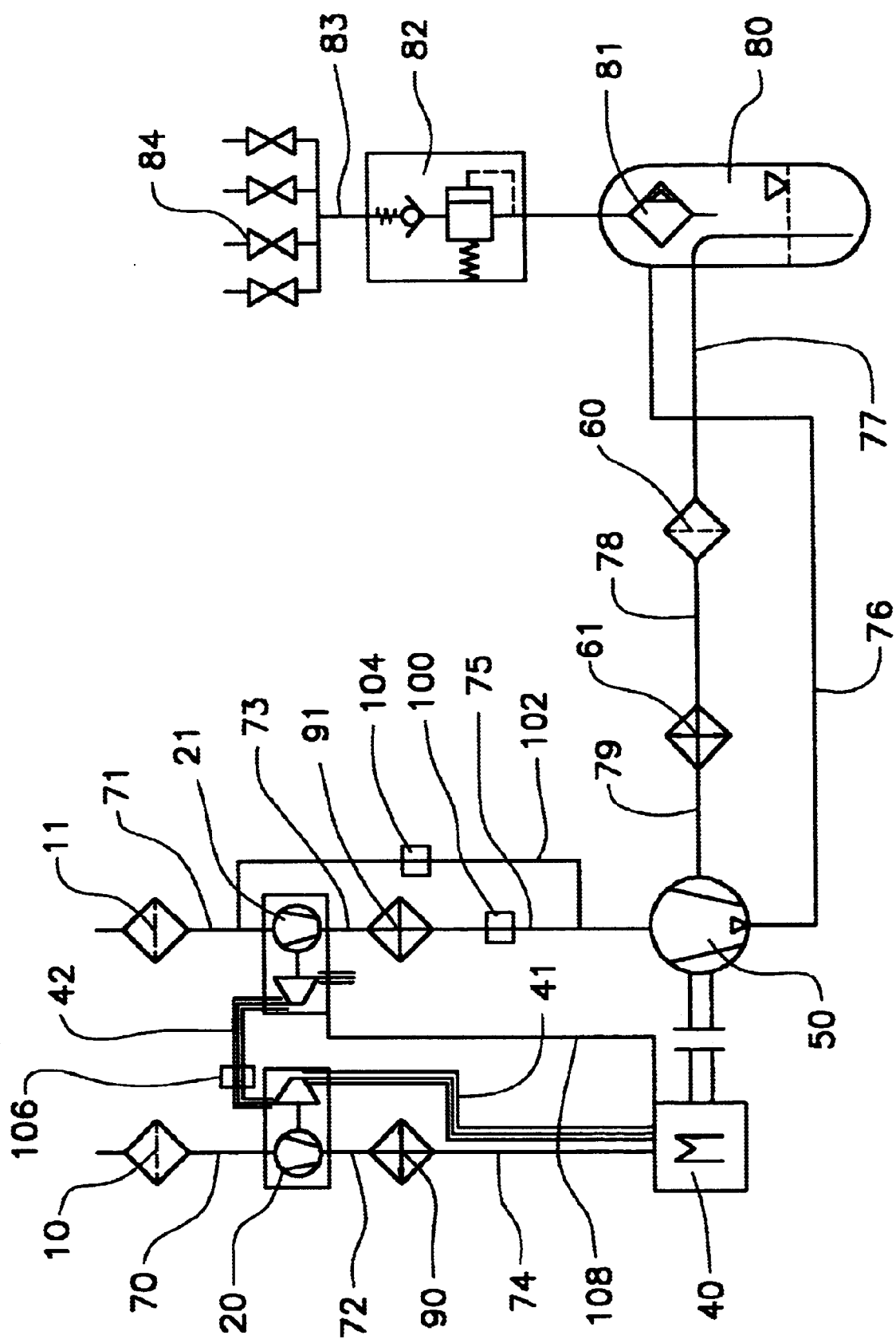

COMPRESSOR WITH SUPERCHARGED INLET

CROSS-REFERENCE TO RELATED APPLICATIONS

This Application is 371 Application based on PCT/DE00/04388, filed on Dec. 8, 2000, which in turn claims the benefit of priority to German Patent Application No. 19960152.6, filed on Dec. 14, 1999. The entirety of both applications are incorporated herein by reference.

BACKGROUND OF THE INVENTION

The Patent Specification DE 41 23 208 C 2 describes a compressor system in which at least one exhaust turbocharger is located on the drive side in the suction and/or pressure piping of a compressor on the exhaust side of an internal combustion engine and supplies the compressor with precompressed air and/or subsequently compresses the air compressed by the compressor.

The drawback here is that the exhaust backpressure of an internal combustion engine is increased when one or more exhaust turbochargers are placed in its exhaust train and so its mechanical performance is reduced. The exhaust backpressure rises to about 1.5 bar and produces a reduction in mechanical performance due to the increased working of the internal combustion engine pistons, this reduction being about 20% in traditional internal combustion engines with a low mean effective pressure. In addition, the exhaust backpressure leads to poorer filling of the internal combustion engine with fresh air, which means that the fuel quantity has to be reduced for achievement of complete combustion of fuel and the performance of the internal combustion engine drops. In traditional, naturally aspirated engines, the loss of performance caused in this way amounts to about 10%.

Thus a total loss of performance of about 30% results in the internal combustion engine. This loss of performance in the internal combustion engine and the resulting compression loss of the compressor driven by the internal combustion engine is too high, since it cannot be compensated by additional compression gained from use of exhaust turbochargers.

The higher construction costs for the compressor system under Patent Specification DE 41 23 208 C 2 in comparison with a traditional compressor system without an exhaust turbocharger upstream of the compressor mean that such a system is very uneconomical and inefficient.

U.S. Pat. No. 2,849,173 describes a compressor system in which the exhaust gases of a thermal engine driving a piston compressor also drive a gas turbine which supplies the piston compressor with precompressed air via a compressor driven by the gas turbine. A multistage axial-flow compressor is shown here as the upstream compressor. With the technical method shown, the drawback is that such a compressor system constitutes an expensive and unwieldy solution because of the multistage axial-flow compressor and is thus unsuitable for use as a mobile compressor system. In addition, the internal combustion engine has a large loss in performance due to the high exhaust backpressure caused by the downstream gas turbine compressor stage. So this technical method does not achieve any improvement in the efficiency of a compressor system by upstream connection of a precompression stage driven by exhaust gases.

U.S. Pat. No. 3,204,859 also describes an arrangement in which an exhaust turbocharger is driven by the exhaust gases of a thermal engine. This invention shows the division of air precompressed by a turbocharger between the engine on the one hand and the compressor itself on the other. On the one hand, fresh air is taken in by the compressor and on the other it is supplied with precompressed air by the turbocompressor if the boost pressure exceeds that required by the engine, i.e. there is surplus precompression pressure which leads to the opening of a valve to the compressor. The drawback in this arrangement is that only part of the precompressed air is available for the compressor itself—and only when boost pressure has reached a certain level. It is also a disadvantage that the precompressed air in the compressor is fed into an intermediate area. This produces problems with the sealing and dimensioning of the machine, since there is a rise in the volumetric flow in the intermediate area.

U.S. Pat. No. 4,563,132 describes an engine-compressor unit in which two turbochargers driven by the exhaust gases of the engine are located in the compressor intake pipe. As in the patent specification U.S. Pat. No. 3,204,859, there is a division of precompressed air between engine and compressor with the help of a valve here too. The drawback here is that the engine and compressor run at the same speed, so that no variation of pressure and quantity supplied is possible. Thus the engine-compressor unit is not suitable for use as a mobile compressor unit but designed for engine operation, since the compressor side is not ideal.

BRIEF SUMMARY OF THE INVENTION

This invention relates to a compressor system for production of compressed air, consisting of a compressor driven by an internal combustion engine, connected by piping to compressed air discharge points and supplied with precompressed air by an exhaust turbocharger on the drive side connected on the exhaust side of the internal combustion engine.

Such a compressor system is designed to use process heat to increase the efficiency of the system and thus save energy.

The aim of the invention is to achieve an improvement in the overall efficiency of a compressor system with an exhaust turbocharger upstream of the compressor, thus enabling cost-efficient application of such a compressor system.

The invention achieves this through the characteristic features under Patent claim 1. The sub-claims 4 to 9 describe advantageous forms of the invention.

Thus overall efficiency is improved by arranging two exhaust turbochargers in line so that the exhaust gas mass flow of a diesel engine drives the first exhaust turbocharger first, which supplies compressed air to this diesel engine, and then drives the second exhaust turbocharger which supplies the compressor with precompressed air. In this arrangement, the turbine-side wheel geometry, such as the wheel diameter, of the exhaust turbocharger upstream of the displacement compressor is matched to the different mass flows on the turbine side and compressor side of the exhaust turbocharger, and the turbine-side wheel geometry, such as the outside wheel diameter, of the exhaust turbocharger upstream of the diesel engine is matched to the exhaust backpressure and temperature resulting from the downstream exhaust turbocharger of the displacement compressor.

Thanks to the boost in the mean effective pressure of the diesel engine achieved in this way, the loss of mechanical performance is reduced to about 15%. Loss of performance due to poorer filling of the diesel engine with fresh air can be avoided by higher boost pressure. Thus the total loss of performance of the diesel engine resulting from exhaust back pressure is reduced to about 15%.

An additional reduction in diesel engine losses can be achieved by intermediate cooling of the charge air before it enters the diesel engine. The mean effective pressure of the diesel engine is boosted in this way, so that the exhaust backpressure of about 1.5 bar only leads to a loss in mechanical performance of about 10%. Neither do any losses result from poor filling of the diesel engine with fresh air in this case, so that total loss in performance is reduced to about 10%.

The compressor performance gained in the exhaust turbocharger before the displacement compressor corresponds to about 25% of the mechanical performance of the engine. As a result, a gain in performance of 15% is produced for the compressor system forming the subject of the invention.

In addition, the compressor system forming the subject of the invention, with a diesel engine and an exhaust turbocharger, has the advantage that the useful speed range of the diesel engine is greater here. A change in the speed of the diesel engine is of great importance, since the intake of compressed air from the compressor system fluctuates and so the engine speed is increased or reduced in accordance with the intake of compressed air. In traditional compressor systems, the engine speed can only be reduced by 30% to 40%, related to a maximum useful speed, since the compressor requires an approximately equal torque for provision of constant end pressure extending over the whole speed range of the engine. For example, the useful speed range is between 2500 revolutions per minute and 1500 revolutions per minute.

In the compressor system with an additional exhaust turbocharger, the torque requirement consists of two elements, namely that of the worm compressor and that of the additional turbocharger. With decreasing speed of the diesel engine, exhaust turbocharger performance sinks and thus the exhaust backpressure too. The falling exhaust backpressure then produces a rise in the mechanically useful torque of the diesel engine, so that, even in this operating condition, there is adequate engine torque for provision of the desired end pressure by the compressor. Thus it is possible to extend the speed range of the diesel engine to include low speeds, so that a speed range between 2500 revolutions per minute and 1000 revolutions per minute can be used. This corresponds to an increase in the useful speed range by about 50%. Precisely because there is only a sporadic intake of compressed air from the compressor system, the using of lower speeds of the diesel engine leads to a fuel-saving potential of up to 30% in comparison with traditional compressor systems.

Another advantage of the compressor system forming the subject of the invention is the use of a displacement compressor. In compressor systems driven by internal combustion engines, it is customary to regulate the supplied amount of compressed air via machine speed too. However, a reduction in engine speed and a resulting loss of intake pressure also produce a reduction in the compressor performance of the exhaust turbocharger located upstream of the compressor. The resulting lower intake pressure leads to generation of a higher pressure ratio by the compressor to achieve the desired constant end pressure.

The compressor system forming the subject of the invention solves this problem by using a displacement compressor, which is able to supply constant end pressure even when there are changes in pressure conditions upstream of the compressor, since there is practically no exhaust chamber. In particular, use of a liquid-injected displacement compressor is recommended, such as a worm or rotary compressor.

Another advantage of use of a liquid-injected displacement compressor is that even a one-stage construction version can provide the required compression, meaning that the whole compressor system can be kept small in size.

The overall efficiency of such a machine is improved by the positioning in line, on the exhaust gas side, of a first exhaust turbocharger (20), supplying precompressed air to a diesel engine (40), and a second exhaust turbocharger (21), supplying precompressed air to a liquid-injected displacement compressor (50), with the turbine-side wheel geometry, such as the outside wheel diameter, of the exhaust turbocharger (20) being matched to the exhaust backpressure and temperature resulting from the downstream exhaust turbocharger (21) of the displacement compressor (50) and the turbine-side wheel geometry, such as the wheel diameter, of the exhaust turbocharger (21) being matched to the different mass flows on the turbine side and compressor side of the exhaust turbocharger (21).

BRIEF DESCRIPTION OF THE DRAWINGS

The sole FIGURE is a construction version of the compressor system forming the subject of the invention, in accordance with one embodiment of the present invention.

DETAILED DESCRIPTION OF THE INVENTION

Combustion air is cleaned via an air filter 10 and supplied to an exhaust turbocharger 20 via an intake pipe 70.

A pipe 72 takes the combustion air, now precompressed, to an intermediate cooler 90 and a pipe 74 takes the cooled combustion air to a diesel engine 40.

A pipe 41 takes the exhaust gas from the diesel engine 40 to the exhaust turbocharger 20. A connection 42, which must be as short as possible, runs the partially expanded exhaust gas to a second exhaust turbocharger 21. After passing through the exhaust turbocharger 21, the expanded exhaust gas is discharged.

The air for compression is supplied to the exhaust turbocharger 21 via an air filter 11 and an intake pipe 71.

A pipe 73 then takes the now precompressed combustion air to an intermediate cooler 91 and a pipe 75 takes the cooled precompressed air to a liquid-injected displacement compressor 50.

A pressure pipe 76 takes the compressed air with the injected liquid to a pressure tank 80, where a liquid separator 81 separates the injected liquid from the compressed air. Via a pipe 77, filter 60, pipe 78, cooler 61 and pipe 79, the injected liquid is run back to the liquid-injected displacement compressor.

The compressed air is supplied from the pressure tank 80 via the liquid separator 81, a pressure-maintaining check valve 82 and a pipe 83 to the compressed air discharge points 84.

A pneumatic valve 100 is disposed between exhaust turbocharger 21 and the displacement compressor 50 so that precompressed air from exhaust turbocharger 21 may be let off in the event that only a small amount of compressed air or no compressed air at all is taken at compressed air discharge points 84.

A return piping 102 is provided with a valve 104 is provided from the supply side of displacement compressor 50 to intake pipe 71 of exhaust turbocharger 21 so that precompressed air from turbocharger 21 may be returned in the event that only a small amount of compressed air or no compressed air at all is taken at compressed air discharge points 84.

A pneumatic valve 106 is disposed on supply line 42 to exhaust turbocharger 21 so that exhaust gasses supplied to exhaust turbocharger 21 may be let off in the event that only a small amount of compressed air or no compressed air at all is taken at compressed air discharge points 84.

A oil circulation connection 108 is provided between exhaust turbocharger 21 of displacement compressor 50 and diesel engine 40.

What is claimed is:

1. A compressor system for production of compressed air to a compressed air discharge point, said system comprising:

a first exhaust turbocharger having a first turbine side and a first compressor side, coupled to the exhaust of an internal combustion engine, said first exhaust turbocharger configured to provide precompressed air to said internal combustion engine; and a second exhaust turbo charger having a second turbine side and a second compressor side, coupled in line to a first turbine side exhaust output of said first exhaust turbocharger, said second exhaust turbocharger configured to provide precompressed air to a liquid-injected displacement compressor, wherein said first turbine side of said first exhaust turbocharger has a wheel geometry that is a function of the exhaust backpressure on said internal combustion engine and the temperature resulting from said second exhaust turbocharger and wherein said second turbine side of said second exhaust turbocharger is a function of the mass flow from said first turbine side of said first exhaust turbocharger and the mass flow required by said second compressor side of said second exhaust turbocharger to support said compressor.

2. The compressor system as claimed in claim 1, further comprising a first pneumatic valve disposed between said second exhaust turbocharger and said displacement compressor configured to let off precompressed air from said second exhaust turbocharger in the case of either one of two events, where the first event is that a reduced amount of compressed air is taken at the compressed air discharge point and the second event is that no air is taken at the compressed air discharge point.

3. The compressor system as claimed in claim 1, further comprising a return pipe, coupled at a first end to an intake pipe for said second exhaust turbocharger and coupled at a second end to a precompressed output pipe of said second exhaust turbocharger, said return pipe having a valve disposed thereon, so that precompressed air, output from said second exhaust turbocharger can be returned to said second exhaust turbocharger in the case of either one of two events, where the first event is that a reduced amount of compressed air is taken at the compressed air discharge point and the second event is that no air is taken at the compressed air discharge point.

4. The compressor system as claimed in claim 1, further comprising a second pneumatic valve disposed on a supply line located between said first exhaust turbocharger and said second exhaust turbocharger so that exhaust gases supplied to said second exhaust turbocharger by said supply line can be let out in the case of either one of two events, where the first event is that a reduced amount of compressed air is taken at the compressed air discharge point and the second event is that no air is taken at the compressed air discharge point.

5. The compressor system as claimed in claim 1, wherein said second exhaust turbocharger is coupled in substantial proximity to said first turbine side exhaust output of said first exhaust turbocharger.

6. The compressor system as claimed in claim 1, further comprising a connection between said second exhaust turbocharger and said oil circulation of said internal combustion engine.

7. The compressor system as claimed in claim 1, wherein said second exhaust turbocharger is directly coupled to the exhaust of said internal combustion engine.

8. The compressor system as claimed in claim 1, wherein both said second turbine side and a second compressor side of said second exhaust turbocharger maintain radially constructed wheels.

9. The compressor system as claimed in claim 1, wherein said internal combustion engine is a diesel engine.

10. The compressor system as claimed in claim 1, further comprising a first intermediate cooler coupled to a first exhaust turbocharger configured to cool the compressed air before it enter said internal combustion engine and a second intermediate cooler coupled to the second exhaust turbocharger, configured to cool the compressed air before it enters said compressor.

* * * * *